No. 777,244. PATENTED DEC. 13, 1904.
M. L. COONEY.
MUD GUARD.
APPLICATION FILED MAY 14, 1904.
NO MODEL.
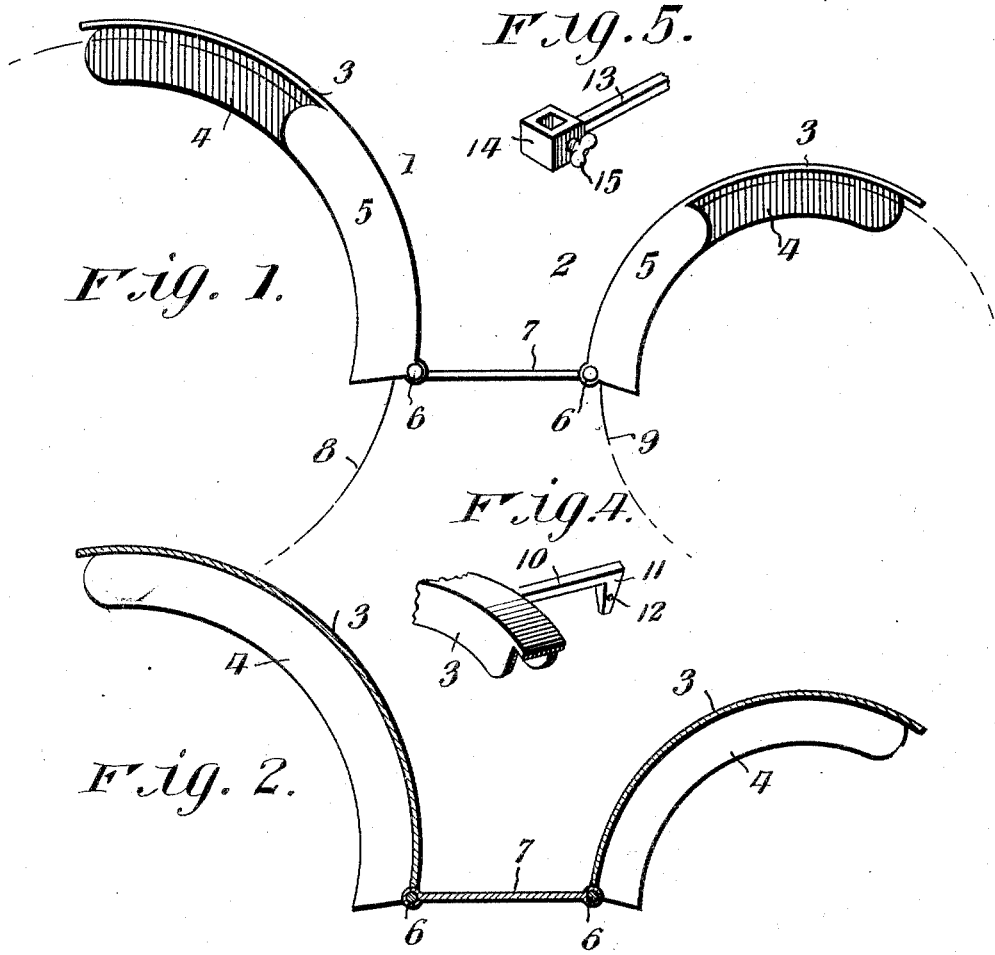
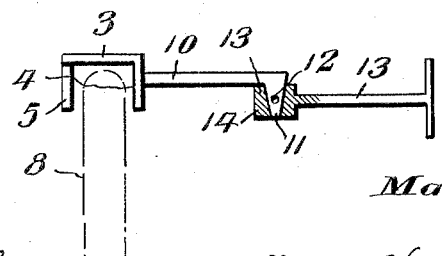
Inventor
Mamie L. Cooney.
Witnesses
By Victor J. Evans
Attorney No. 777,244. Patented December 13, 1904.

UNITED STATES PATENT OFFICE.

MAMIE L. COONEY, OF NEW ORLEANS, LOUISIANA.

MUD-GUARD.

SPECIFICATION forming part of Letters Patent No. 777,244, dated December 13, 1904.

Application filed May 14, 1904. Serial No. 208,043. (No model.)

*To all whom it may concern:*

Be it known that I, MAMIE L. COONEY, a citizen of the United States, residing at New Orleans, in the parish of Orleans and State of Louisiana, have invented new and useful Improvements in Mud-Guards, of which the following is a specification.

This invention relates to mud-guards, the object of the invention being to provide a mud-guard especially adapted for use upon automobiles and wheeled vehicles in general.

In wheeled vehicles, and especially automobiles and vehicles of a like character upon which inflatable tires are used, it is frequently necessary to get access to all parts of the tire; and hence the primary object of the present invention is to provide a construction of mud-guard which will enable the sections of the mud-guard to be folded and swung away from the wheels which they partially cover, while at the same time the sections of the guard are so mounted that they are effectively supported in proper relation to the wheels for securing the best results.

With the above and other objects in view the invention consists in the novel construction, combination, and arrangement of parts, as herein fully described, illustrated, and claimed.

In the accompanying drawings, Figure 1 is a side elevation of a mud-guard embodying the present invention, showing the relation thereof to the wheels of a vehicle, which wheels are indicated by dotted lines. Fig. 2 is a sectional elevation of the mud-guard. Fig. 3 is a cross-sectional view of the same. Fig. 4 is a detail perspective view of a portion of one of the mud-guard sections, showing the sustaining arm and tongue. Fig. 5 is a detail perspective view of one of the supporting-brackets.

Like reference-numerals designate corresponding parts in all the figures of the drawings.

Referring to the drawings, it will be seen that the mud-guard comprises sections 1 and 2, each of which is of segmental form, curved on the arc of a circle concentric with the axle of the wheel in connection with which it is used. Each section comprises an outer rim portion 3 and the sides or flanges 4 and 5, which are preferably of different length, as shown in Fig. 1, the sides or flanges 4 next to the vehicle being preferably longer than the sides or flanges 5, which extend upon the outer sides of the wheel-rims. The relative lengths of the sections and the sides or flanges thereof may, however, be changed at will to suit the manufacturer or the particular form of vehicle in connection with which the mud-guard as a whole is used.

In carrying out the present invention the sections 1 and 2 are hinged at their inner ends, as shown at 6, to opposite sides of the vehicle-step, which is shown at 7, the said hinged or jointed connection being fully illustrated in Figs. 1 and 2, in which it will be seen that the step 7 is located between the wheels, (indicated at 8 and 9.) By providing the jointed connection at the point 6 it will be seen that the sections 1 and 2 may be folded or swung toward each other for giving access to the wheel-tires.

Each of the sections 1 and 2 is provided, at or near the outer end portion thereof, with a laterally and inwardly projecting sustaining-arm 10, which is terminally provided with a pendent tongue 11, preferably made tapering toward its extremity, as shown, and provided with a recess or depression 12, the purpose of which will appear. In connection with each sustaining-arm 10 a supporting-bracket is employed, said bracket being secured to the frame of the vehicle and comprising an arm 13, which is rigidly connected to the vehicle-frame and terminally provided with a socket or apertured head 14, having a binding-screw 15, the inner end of which is adapted to enter the recess or depression 12 in the tongue 11 when said tongue is inserted in the socket or head 14, thus securely holding the sustaining-arm 10 and supporting the mud-guard section to which the arm is connected. It will be understood that each of the sections 1 and 2 is supported in the manner just above described. By loosening the binding-screws 15 the tongues 11 may be withdrawn from the sockets and the sections swung toward each other. After the tires have been repaired the sections of the mud-guard may be returned to their operative positions over the tires and again secured by the means described.

The device as a whole not only prevents the throwing of mud upon the vehicle and the occupants therein, but also forms a guard or shield for the clothes of the occupant in entering or alighting from the vehicle.

Having thus described the invention, what is claimed as new is—

1. A mud-guard comprising curved sections adapted to embrace portions of adjacent wheels, said sections lying at opposite sides of a vehicle-step and having a jointed connection therewith, and means for supporting the sections on the vehicle-frame.

2. A mud-guard comprising curved sections embracing portions of adjacent wheels, said sections lying at opposite sides of a vehicle-step and having a jointed connection therewith, and means for detachably connecting the sections to the vehicle-frame.

3. The combination with a vehicle, of a mud-guard embodying curved sections embracing portions of adjacent wheels and hinged at their inner ends to the vehicle-step, the opposite ends of the sections being supported by means which detachably connect the sections to the frame of the vehicle.

In testimony whereof I affix my signature in presence of two witnesses.

MAMIE L. COONEY.

Witnesses:
EDWARD VINCENT,
F. S. WEIS.